(12) United States Patent
Grigorian

(10) Patent No.: US 7,776,112 B2
(45) Date of Patent: Aug. 17, 2010

(54) METHODS FOR PRODUCTION OF HYDROGEN

(75) Inventor: Leonid Grigorian, Columbus, OH (US)

(73) Assignee: Honda Motor Co., Ltd. (JP)

( * ) Notice: Subject to any disclaimer, the term of this patent is extended or adjusted under 35 U.S.C. 154(b) by 626 days.

(21) Appl. No.: 11/672,907

(22) Filed: Feb. 8, 2007

(65) Prior Publication Data

US 2008/0193807 A1    Aug. 14, 2008

Related U.S. Application Data

(63) Continuation of application No. 10/669,297, filed on Sep. 23, 2003, now Pat. No. 7,189,382.

(60) Provisional application No. 60/414,462, filed on Sep. 26, 2002, provisional application No. 60/443,246, filed on Jan. 28, 2003.

(51) Int. Cl.
*B01J 7/00*    (2006.01)

(52) U.S. Cl. ............... 48/61; 48/127.9; 48/127.1; 48/211; 422/211; 423/650; 423/651; 423/652; 423/653; 423/654; 429/19; 429/20

(58) Field of Classification Search ............. 48/61, 48/211, 127.9, 127.1; 423/650–654; 429/19, 429/20; 422/211
See application file for complete search history.

(56) References Cited

U.S. PATENT DOCUMENTS

| 4,056,607 A | * | 11/1977 | Behr | .......... 423/579 |
| 2007/0017154 A1 | * | 1/2007 | Hsu | ............ 48/61 |

* cited by examiner

*Primary Examiner*—Alexa D. Neckel
*Assistant Examiner*—Kaity V. Handal
(74) *Attorney, Agent, or Firm*—Fenwick & West LLP; Mark E. Duell

(57) ABSTRACT

Methods, processes, and apparatuses for the production of hydrogen gases are provided. A catalytic amount of iodine is dissolved in a hydrocarbon fuel source, such as cyclopropane and/or benzene, and the mixture is heated to a temperature greater than about 80° C. A reaction vessel capable of maintaining pressures greater than 1 atmosphere is used. The hydrogen gas thus produced is recovered, and optionally purified. The hydrogen gas product can be delivered to a fuel cell stack. The fuel cell stack receives hydrogen gas from the reaction chamber and produces an electric current therefrom as the hydrogen gas is reacted with oxygen to form water.

9 Claims, 2 Drawing Sheets

METHODS FOR PRODUCTION OF HYDROGEN

CROSS-REFERENCE TO RELATED APPLICATION

This application is a continuation of and claims priority from U.S. Ser. No. 10/669,297, filed Sep. 23, 2003, now U.S. Pat. No. 7,189,382, which claims the benefit of and priority from U.S. Provisional Application Nos. 60/414,462, filed Sep. 26, 2002, and 60/443,246, filed Jan. 28, 2003, and which applications are incorporated herein by reference in their entireties.

FIELD OF THE INVENTION

The present invention relates to the production of hydrogen gas.

BACKGROUND

Hydrogen gas is used in the manufacture of many products including metals, hydrotreating and hydrocracking in refineries, commercial catalytic hydrogenation for high volume chemicals, edible fats and oils processing, and in semiconductors and microelectronics industrial processes. Hydrogen gas is also an important fuel source for many energy conversion devices. For example, fuel cells use purified hydrogen and an oxidant to produce an electrical potential. Thus, hydrogen gas is a critical component for the production of high-grade chemicals and clean-burning fuels, and is the cleanest, highest energy content fuel on a weight basis. However, because hydrogen is a very explosive gas, its use has been limited by the need for supplying it in high-pressure cylinders.

There are numerous industrial methods for the generation of hydrogen gas including electrolysis of water (U.S. Pat. No. 5,037,518), reaction of a metal with an acid, reaction of certain metals with a strongly alkaline compound, reaction of calcium hydride with water (U.S. Pat. No. 5,833,934), steam reforming of methyl alcohol or methane in natural gas (U.S. Pat. Nos. 4,454,207 and 4,642,272), releasing of hydrogen gas from a hydrogen-loaded hydrogen-absorbing metal or alloy (U.S. Pat. No. 6,596,055), and so on.

One of the current limitations in developing fuel cell technology is the lack of an efficient, controllable, and cost-effective method for producing hydrogen ($H_2$) on an 'as-needed' basis for reaction in the fuel cell. For example, current chemical hydride methods of generating $H_2$ have the drawback that once $H_2$ production begins, the reaction cannot be stopped. Thus, $H_2$ continues to be produced and either must be used by the fuel cell, stored as a gas, or wasted due to release. Alternatively, $H_2$ for a fuel cell can be stored as liquid hydrogen. However, this requires specialized equipment to safely store the liquid $H_2$ under the necessary temperature and pressure conditions. Additional shortcomings of current methods include low yield from the hydrogen producing reactions, severe processing conditions such as high reaction temperatures, consumption of a large quantity of energy, and high operating costs. Thus, efficient and cost-effective methods for producing $H_2$ on demand are needed, preferably where hydrogen is produced from a hydrocarbon fuel source.

Hydrogen has been generated from hydrocarbon fuel sources in a process called steam reforming where steam and a hydrocarbon are reacted in the presence of a catalyst. Examples of suitable hydrocarbons are alcohols, such as methanol or ethanol, and alkanes such as methane, propane, gasoline or kerosene. Steam reforming requires an elevated operating temperature of between 250° C. and 900° C., and produces primarily hydrogen and carbon dioxide, with lesser quantities of carbon monoxide also being formed. Efficient operation of the fuel processor requires careful indexing and control of the ratio of water (steam) to carbon-containing feedstock. Trace quantities of unreacted reactants and trace quantities of byproducts also can result from steam reforming. Therefore, a subsequent purification process to remove the impurities is normally employed. The process thus requires high capital costs. In addition, due to the size of the reactor, steam reforming is not suitable for the purpose of hydrogen supply to fuel cells which must naturally be very compact in size and light in weight. Thus, steam reforming is only economically viable for large, commercial scale production of hydrogen gas.

Thus, there is a need for methods of producing of hydrogen gas that are efficient and cost-effective. Preferably the methods allow for the production of hydrogen on an as-needed basis with little or no impurities being formed, requires low capital costs, and produces hydrogen gas in a process that is environmentally friendly.

SUMMARY

The present invention provides methods, apparatuses, and processes for the production of hydrogen gas by reacting iodine ($I_2$) with either benzene or cyclohexane in the liquid phase. The reaction produces $H_2$ and a solid residue composed primarily of carbon (C). The reaction can be initiated by changing the pressure and/or temperature of the reactants, and the reaction can be selectively and repeatedly started and stopped by adjusting the temperature and/or pressure. Additionally, the ratio of the catalyst to the hydrocarbon fuel can be varied to influence the rate of hydrogen production.

In one aspect, the invention provides method for generation of hydrogen gas, the method comprising contacting a hydrocarbon fuel with iodine to provide a mixture and heating the mixture under pressure thereby generating hydrogen gas. The hydrocarbon fuel can be a cycloalkane, such as cyclohexane or an aryl compound, such as benzene. In addition, mixtures of cycloalkane and aryl compounds can be used as the hydrocarbon fuel. Preferably, catalytic amounts of iodine are used. The mixture can be heated in a reaction vessel to a temperature of about 60° C. to 500° C., preferably about 80° C. to about 250° C., more preferably about 80° C. to 100° C. The pressure is preferably greater than about 2 atmospheres. The hydrogen gas thus produced can be collected and purified.

In another aspect, the invention provides systems for the production of hydrogen gas. The systems comprise a reaction container containing a composition comprising a hydrocarbon fuel and iodine, and causing the composition to react in the container to generate hydrogen gas. The hydrocarbon fuel can be a cycloalkane, such as cyclohexane, an aryl compound, such as benzene or mixtures of cycloalkane and aryl compounds. Preferably, catalytic amounts of iodine are used. The mixture can be heated in a reaction vessel to a temperature of about 60° C. to 500° C., preferably about 80° C. to about 250° C., more preferably above about 80° C. The hydrogen gas thus produced can be collected and purified.

These and other aspects of the present invention will become evident upon reference to the following detailed description. In addition, various references are set forth herein which describe in more detail certain procedures or compositions, and are therefore incorporated by reference in their entirety.

DETAILED DESCRIPTION

I. Definitions

Figure 1:
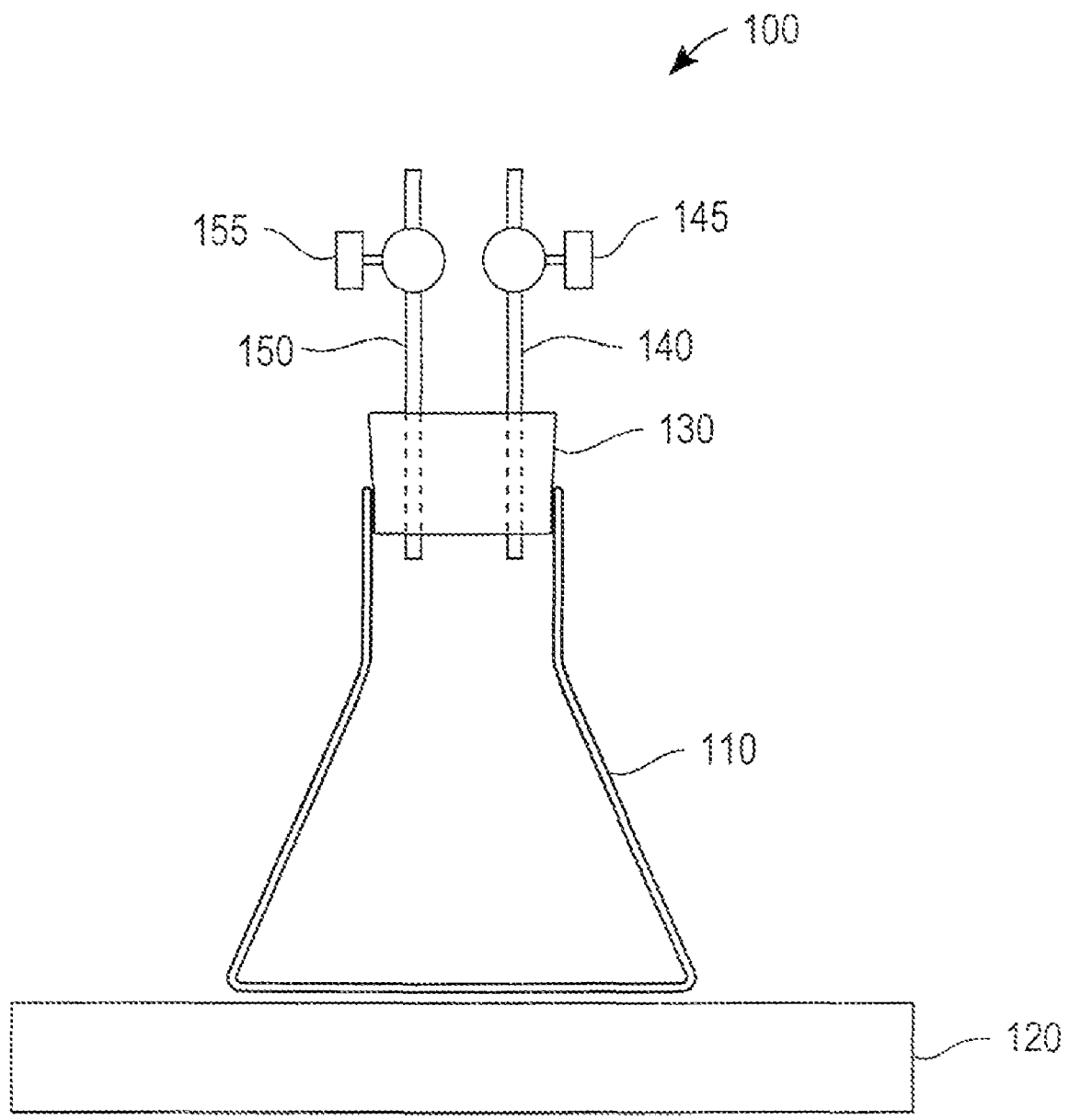
FIG. 1 illustrates an apparatus for use in the present invention.

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry $3^{rd}$ Ed." Vols. A and B, Plenum Press, New York, and Cotton et al. (1999) "Advanced Inorganic Chemistry $6^{th}$ Ed." Wiley, New York.

The term "cycloalkyl" means the monovalent branched or unbranched saturated cyclic hydrocarbon compound, consisting solely of carbon and hydrogen atoms, having from three to twelve carbon atoms inclusive, unless otherwise indicated. Examples of cyclolkyl compounds include, but are not limited to, cyclopropane, cyclopentane, cyclohexane, cycloheptane, and the like.

The term "aryl" means the monovalent monocyclic aromatic hydrocarbon radical consisting of one or more fused rings in which at least one ring is aromatic in nature, which can optionally be substituted with hydroxy, cyano, lower alkyl, lower alkoxy, thioalkyl, halogen, haloalkyl, hydroxyalkyl, nitro, alkoxycarbonyl, amino, alkylamino, dialkylamino, aminocarbonyl, carbonylamino, aminosulfonyl, sulfonylamino, and/or trifluoromethyl, unless otherwise indicated. Examples of aryl radicals include, but are not limited to, phenyl, naphthyl, biphenyl, indanyl, anthraquinolyl, and the like.

The term "halogen" as used herein refers to fluorine, bromine, chlorine and/or iodine.

II. Modes of Carrying Out the Invention

The present invention discloses methods, apparatus, and processes for the production of hydrogen gas. The methods and processes disclosed herein are advantageous in that they provide hydrogen gas that is free of carbon dioxide, carbon monoxide, sulfur, nitrogen and steam. Further, hydrogen production can be initiated when needed by either raising the temperature to about 60° C. to 500° C., or by increasing the reaction pressure to above atmospheric pressure. Further, the production of hydrogen can be terminated by lowering the temperature below about 70° C., or by decreasing the reaction pressure to about atmospheric pressure.

The methods of the invention utilize compositions of hydrocarbon fuel sources mixed with iodine. In the methods of producing hydrogen, the compositions are heated to a temperature of about 60° C. to 500° C., while the pressure in the reaction vessel is allowed to increase to above one atmosphere. Alternatively, the composition is first heated to a temperature of about 60° C. to 500° C., and subsequently the pressure in the reaction vessel is allowed to increase to above one atmosphere. In yet another aspect, the composition is first pressurized to above one atmosphere, and then the temperature is raised to about 60° C. to 500° C. The hydrogen produced can be used immediately, purified, or collected and stored for later use.

The composition for use in the inventive methods include a hydrocarbon fuel sources and a catalyst. The hydrocarbon fuel source can be a cycloalkyl compound, an aryl compound, or mixtures thereof. Preferably, the cycloalkyl compound is cyclohexane, the aryl compound is benzene, and the catalyst is iodine. Without being bound by any particular theory, it is believed that hydrogen gas is produced according to the following reaction scheme:

(1)

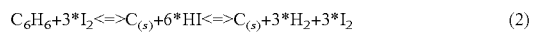

(2)

Thus, $I_2$ serves as a catalyst and is not consumed by the reaction. It is believed that the presence of deprotonated benzene or cyclohexane is involved in the conversion of HI to $H_2$ and $I_2$. Therefore, in one aspect of the invention, the composition for use in the methods of the invention comprise hydrocarbon fuel and the catalyt in a ratio of about 200:1 to about 1:2 (mol/mol), preferably about 100:1 to about 5:1, or more preferably about 50:1 to about 10:1, or any ratio in between.

Typically, the hydrocarbon fuels and the catalyst are mixed in the desired ratio. The components of the composition can be added to the raction chamber separately and then mixed, or they can be first mixed and then added to the reaction chamber.

In the methods of the invention, the hydrocarbon and the iodine catalyst are caused to be reacted thereby producing hydrogen. In one aspect, the production of hydrogen can be initated by increasing the temperature of the reactants to a temperature that is above the ambient temperature. The temperature can be increased to about 60° C. to about 800° C., more preferably from about 80° C. to about 250° C., even more preferably to a temperature of about 80° C. to 100° C. Thus, when the catalyst is iodine (mp=113° C.), the temperature is preferably above about 80° C.

The temperature can be increased by any one of the known methods. Such methods include direct heat, such as from a furnance or a bunsen burner, electrical resistive heating, thermal resistive heating, microwave heating, infrared heating, and heating using laser beam, radio frequency, or ultrasonic irradiation, and the like.

In another aspect of the invention, the production of hydrogen can be initiated by increasing the pressure of the reactants to a pressure that is above atmospheric pressure. The pressure can be increased to about 1.5 atmospheres to about 400 atmospheres, more preferably about 2 atmospheres to about 200 atmosphere, even more preferably about 2 atmospheres to about 2.5 atmospheres. The pressure can be increased using any one of the known methods. Such methods include, for example, heating the compositions in a reaction chamber having a fixed volume, introducing inert gases, such as helium, neon, argon, kryptonite, and xenon, or non-reactant gases into the reaction chamber thereby increasing the pressure, and the like.

Typically, the composition can be heated to a temperature of about 80° C. to about 100° C., and the pressure can be allowed to increase to between about 2 atmospheres to about 2.5 atmospheres. The pressure can be maintained between about 2 atmospheres to about 2.5 atmospheres by venting the gases from the reaction vessel, either periodically or in a continuous controlled manner. As one of skill in the art will recognize, the gases vented can be a mixture of the hydrocarbon fuel, hydrogen, atmospheric gases, iodine and HI. Thus, the hydrogen gas produced may need to be purified. Further, the hydrocarbons that are vented can be reclaimed and added back to the reaction chamber if desired.

The completion of the reaction yields carbon deposits in addition to hydrogen gas. The carbon deposits can ignite upon contact with air thereby generating CO and $CO_2$. Therefore, precautions to guard against uncontrolled ignition of the carbon byproduct may be required. For example, the reaction can be carried out under an inert atmosphere such as a nitrogen, an argon or a helium atmosphere; the reaction can be carried out under normal atmosphere and an inert gas, such as nitrogen, argon or helium, can be injected into the reaction chamber as the hydrogen producing reaction approaches completion; additional hydrocarbon or an inert liquid can be added to the reaction chamber as the hydrogen producing reaction approached completion; or the reaction can be stopped before completion so that the carbon deposits remain covered with a liquid instead of being exposed to air.

As can be seen from the reaction scheme above, each mole of liquid cyclohexane reacts to form 6 moles of molecular hydrogen. Similarly, each mole of liquid benzene reacts to form 3 moles of molecular hydrogen. As a result, the reaction is capable of producing substantial pressure increases when carried out in a fixed volume. For example, a 100 ml test tube reaction vessel containing 0.093 moles (10 ml) of cyclohexane and 0.5 g of $I_2$ is calculated to have a pressure of about 2.5 atmospheres prior to initiation of the reaction at about 110° C. The pressue is due to the vapor pressue of cyclohexane. However, upon complete reaction, about 0.56 moles of $H_2$ will be produced. According to the ideal gas law, the completion of reaction will produce a pressure of about 170 atmospheres at 110° C. Thus, the conversion of cyclohexane to carbon and hydrogen gas under ideal conditions results in a roughly 70-fold pressure increase within the reaction vessel.

As discussed above, the $I_2$ acts as a catalyst which is normally not consumed during the reaction. In another aspect, the reaction can be allowed to proceed until it terminates due to either exhaustion of the hydrocarbon reagent or the inability to maintain the necessary pressure in the reaction vessel when insufficient hydrocarbon remains. The reaction can then restarted by adding additional hydrocarbon alone to the reaction vessel. This process of allowing the reaction to exhaust itself and then adding additional hydrocarbon can be repeated for many cycles. However, it was found that at the end of the 10 cycles, roughly 90% of the $I_2$ still remained in the reaction vessel. Although $I_2$ is not consumed by the reaction, the amount of $I_2$ available is believed to be important, as the rate of hydrogen production may be controlled by varying the amount of $I_2$ present in the reaction vessel. The rate of hydrogen production can be increased by increasing the concentration of iodine in the reaction composition. Further, it was found that increasing the concentration of iodine within the composition results in having to increase the temperature of the composition in order to initiate the production of hydrogen. Thus, increasing the concentration of iodine in the reaction composition requires that the temperature be raised to above about 80° C. to initiate hydrogen gas production.

This apparent catalytic behavior of $I_2$ when using benzene or cyclohexane as the reagent is in contrast to the behavior when the reagent is a multi-ring aromatic, such as naphthalene or anthracene. In comparative examples involving similar reaction conditions except for the use of naphthalene or anthracene as the hydrocarbon, the reaction resulted in a) incomplete consumption of the hydrocarbon, b) a noticeable amount of $I_2$ consumption during the course of the reaction, and c) production of HI as a byproduct of the reaction. The hydrogen production for these experiments was not characterized.

In one experiment, the methods described above were carried out, except the composition contained the aliphatic hydrocarbon isooctane as the fuel source. In this experiment, no reaction was observed after the solution was heated to temperatures as high as 220° C.

The hydrogen gas product can be purified, stored for later use, or delivered for use in processes requiring hydrogen gas. For example, the hydrogen gas product can be purified by passing through a filter that selectively allows the product gas to pass through, while the potential impurities, such carbon and HI, are excluded.

The hydrogen gas product, either directly from the reaction chamber or purified, can be stored in a suitable storage device, such as a hydride bed or storage tank, or delivered for use in processes requiring purified hydrogen gas. For example, the hydrogen gas product can be delivered to a fuel cell stack. Fuel cell stack includes at least one fuel cell, and typically includes multiple fuel cells coupled together. The fuel cell stack receives hydrogen gas from the reaction chamber and produces an electric current therefrom as the hydrogen gas is reacted with oxygen to form water. The electric current produced by the fuel cell stack can then be used to meet the electric load applied by one or more associated devices, such as vehicles, households, generators, boats, and the like. Examples of suitable fuel cells include proton exchange membrane (PEM) fuel cells and alkaline fuel cells.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Production of Hydrogen Gas from Cyclohexane

A 100 mL test tube, having thick walls capable of withstanding increased pressures and having Teflon screwcaps with inlets, was used as a reaction vessel (FIG. 1). Into the reaction vessel was placed 0.5 g (0.002 mol) of solid $I_2$ and 10 mL (0.09 mol) of cyclohexane (density=0.77 g/ml). The catalyst and the hydrocarbon thus have an initial molar ratio of roughly 1:45. The test tube was tightly screwed, as shown in FIG. 1, and then heated to about 80° C., thereby increasing the pressure within the reaction vessel. The temperature was maintained between 80° C. and 100° C., and the pressure was maintained between 2 and 2.5 atmospheres by periodically venting the gases. The hydrogen produced was collected by opening the valve 145. Thus, hydrogen gas can be produced by the reaction of cyclohexane with $I_2$.

Example 2

Production of Hydrogen Gas from Benzene

The procedure of Example 1 was used, except approximately 10 mL (0.11 mol) of benzene (density=0.87 g/ml) was used instead of cyclohexane. Upon heating to about 80° C., the hydrocarbon reagent within the reaction was consumed at a rate of approximately 1 mL/min. This very roughly corresponds to consumption of 0.1 moles/min of the hydrocarbon reagent. The reaction produced hydrogen gas and a solid carbon residue. Raman spectrum of the carbon residue indicated that the carbon was almost completely graphitic, with effectively no hydrogen content. Thus, hydrogen gas can be produced by the reaction of benzene with $I_2$.

Example 3

Effect of Temperature on the Production of Hydrogen Gas

The procedure of Example 2 was carried out, except the temperature was raised to about 75° C. and maintained at that temperature, and the pressure was maintained at between 2 and 2.5 atmospheres. The production of hydrogen or the solid carbon residue was not observed after several hours.

Figure 2:
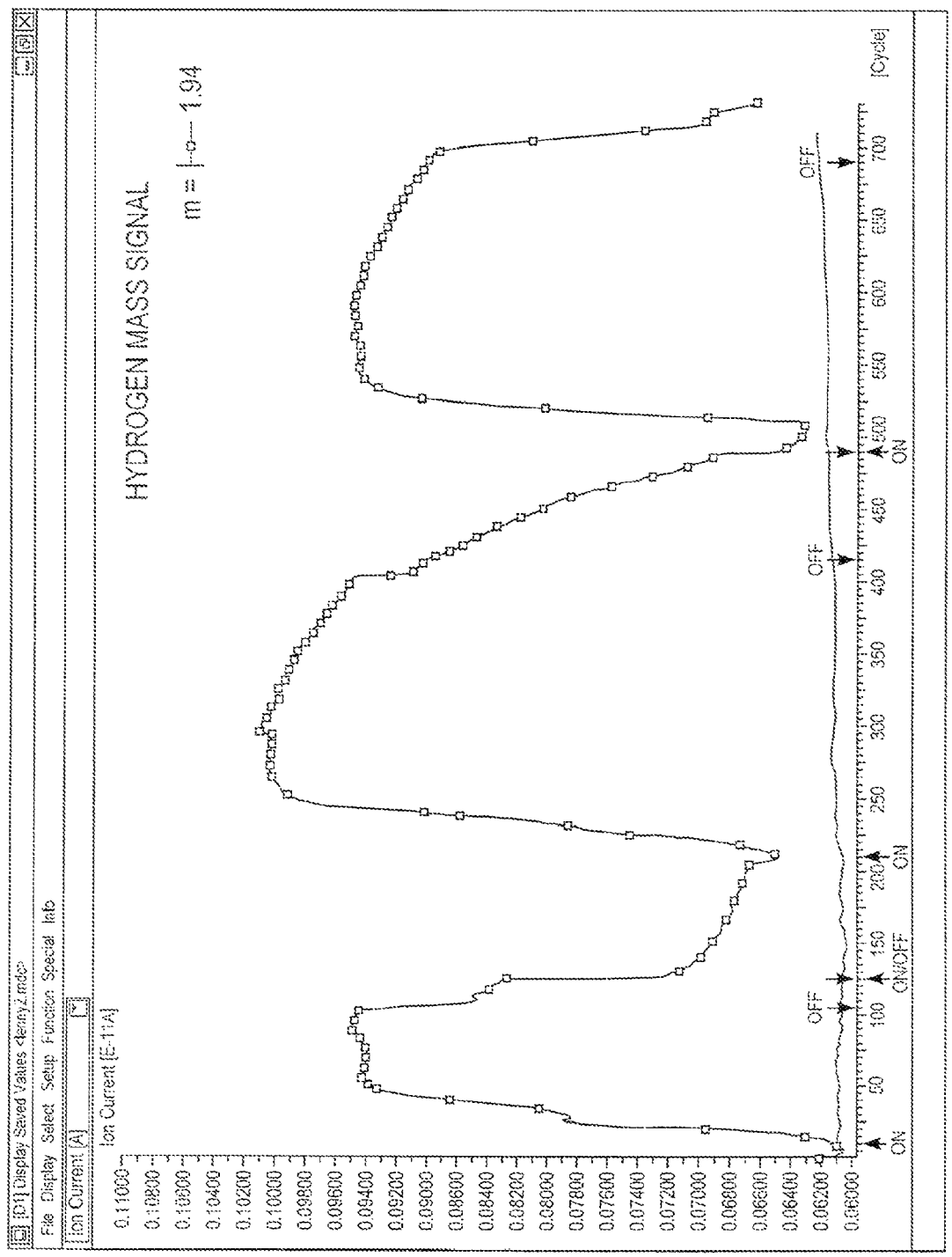
FIG. 2 depicts a plot of output data from a mass spectrometer demonstrating levels of $H_2$ detected exiting a reaction vessel as the reaction temperature is varied.

The production of hydrogen gas was initiated by raising the temperature to about 80° C., while maintaining the pressure at between 2 and 2.5 atmospheres. After a time period, the reaction vessel was allowed to cool to a temperature below about 80° C. FIG. 2 illustrates the effect of temperature on hydrogen gas production. As can be seen in the graph of FIG. 2, high levels of hydrogen gas were measured by mass spectroscopy when the reaction temperature was above about 80° C., and low levels of hydrogen gas were measured by mass spectroscopy when the reaction temperature was below about 80° C. The low levels of $H_2$ registered by the mass spectrometer probably represents residual $H_2$ from periods when the reaction was active, and that this signal would eventually go to zero. The hydrogen producing reaction was reactivated by raising the temperature above about 80° C. Thus, the reaction leading to the production of $H_2$ can be selectively and controllably turned on and off by allowing the temperature to rise and fall in the vicinity of the initiation temperature.

Example 4

Production of Hydrogen Gas using Hydrocarbon Mixtures

The procedure of Example 1 was carried out, except the hydrocarbon reagent was composed of roughly equal parts by volume of cyclohexane and toluene. The temperature was raised to about 110° C. and maintained at that temperature. The production of hydrogen or the solid carbon residue was not observed. The temperature in the reaction vessel was then increased to about 200° C., and the production of hydrogen was detected. Due to the higher temperature required to initiate the reaction, it is believed that the pressure within the reaction vessel was also higher. Similarly, when cyclohexane or benzene was diluted with isooctane, higher temperatures and pressures were required to initiate the reaction, and it is believed that the rate of hydrogen production is reduced when the benzene or cyclohexane is diluted with another hydrocarbon.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

I claim:

1. A fuel cell system comprising:
   a first source of iodine;
   a second source of hydrocarbon fuel; and
   a reaction vessel connected to the first source of iodine and the second source of hydrogen fuel;
   wherein hydrogen gas is generated by reacting the hydrocarbon fuel and the iodine within the reaction vessel, the reaction vessel comprises an outlet adapted to transfer the hydrogen gas to a fuel cell positioned downstream of the reaction vessel, and the fuel cell is capable of generating electricity by making use of the hydrogen gas as a fuel.

2. The fuel cell system of claim 1, wherein the hydrogen gas is generated by an increase in temperature and/or an increase in pressure.

3. The fuel cell system of claim 2, wherein the hydrogen gas is generated by an increase in temperature and an increase in pressure.

4. The fuel cell system of claim 2, wherein the hydrogen gas is generated by first increasing the temperature and then increasing the pressure.

5. The fuel cell system of claim 2, wherein the hydrogen gas is generated by first increasing the pressure and then increasing the temperature.

6. The fuel cell system of claim 2, wherein the temperature is increased to about 80° C. or higher.

7. The fuel cell system of claim 2, wherein the pressure is increased to greater than about 2 atmospheres.

8. The fuel cell system of claim 2, wherein the temperature is between about 80° C. and 100° C., and the pressure is between about 2 atmospheres and 2.5 atmospheres.

9. The fuel cell system of claim 1, wherein the first source and the second source comprise the same source of iodine and hydrocarbon fuel.

* * * * *

UNITED STATES PATENT AND TRADEMARK OFFICE
CERTIFICATE OF CORRECTION

| | | |
|---|---|---|
| PATENT NO. | : 7,776,112 B2 | Page 1 of 1 |
| APPLICATION NO. | : 11/672907 | |
| DATED | : August 17, 2010 | |
| INVENTOR(S) | : Grigorian | |

It is certified that error appears in the above-identified patent and that said Letters Patent is hereby corrected as shown below:

Under Abstract, in field (57), replace with:

Methods, processes, and apparatuses for the production of hydrogen gases are provided. In some aspects, a fuel cell system is provided comprising a source of iodine, a source of hydrocarbon fuel, a reaction vessel, hydrogen gas generated by reacting the hydrocarbon fuel and the iodine, and an outlet adapted to transfer the hydrogen gas to a fuel cell, wherein the fuel cell is capable of generating electricity by making use of the hydrogen gas as a fuel.

Signed and Sealed this
Eighteenth Day of January, 2011

David J. Kappos
*Director of the United States Patent and Trademark Office*